Figure 1:
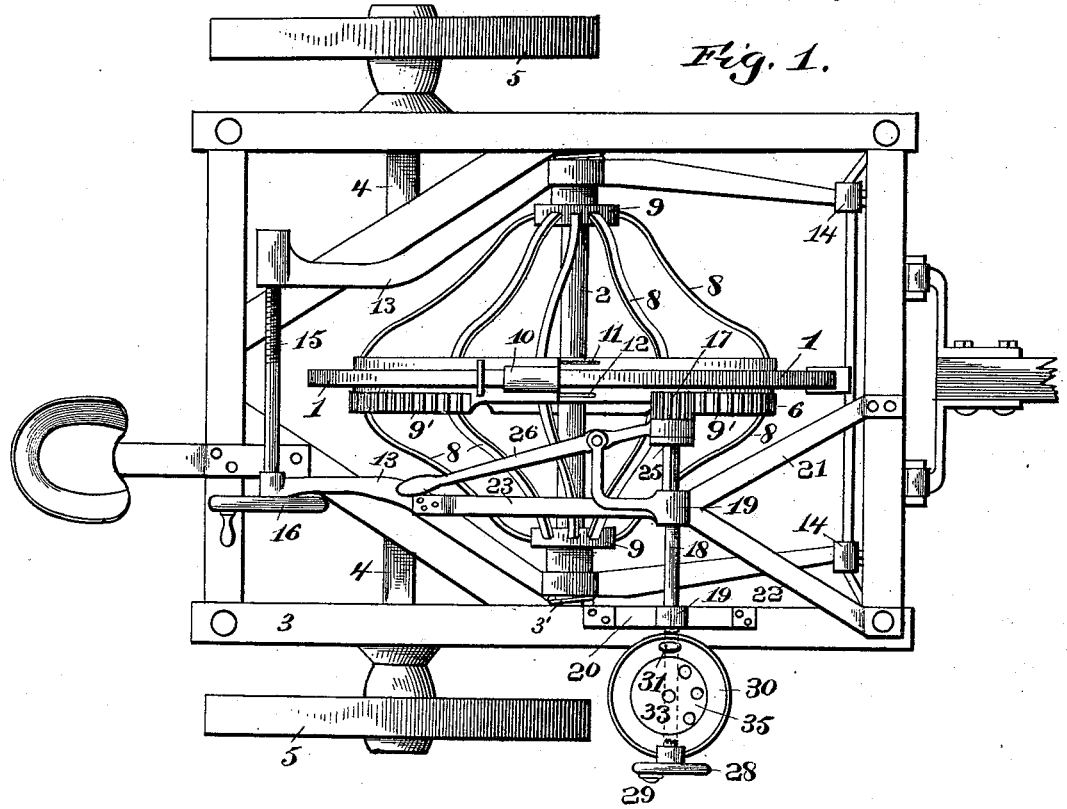

(No Model.) 2 Sheets—Sheet 1.

J. G. BUSCH.
CORN PLANTER.

No. 431,647. Patented July 8, 1890.

Witnesses:
J. B. McGirr.
N. T. Berukoff

Inventor:
John G. Busch
By his Attorneys
Edson Bros.

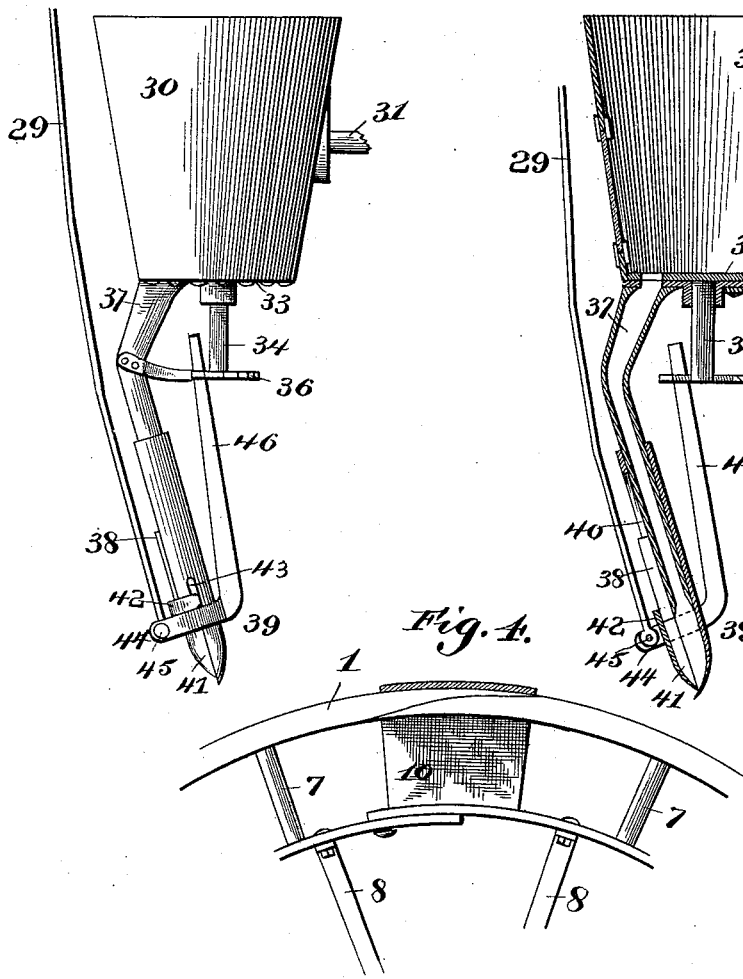

UNITED STATES PATENT OFFICE.

JOHN GEORG BUSCH, OF DICKEYSVILLE, WISCONSIN.

CORN-PLANTER.

SPECIFICATION forming part of Letters Patent No. 431,647, dated July 8, 1890.

Application filed March 28, 1890. Serial No. 345,734. (No model.)

*To all whom it may concern:*

Be it known that I, JOHN GEORG BUSCH, a citizen of the United States, residing in Dickeysville, in the county of Grant and State of Wisconsin, have invented certain new and useful Improvements in Corn-Planters; and I do hereby declare the following to be a full, clear, and exact description of the invention, such as will enable others skilled in the art to which it appertains to make and use the same.

My invention relates to improvements in corn-planters; and the object of my invention is to provide the machine with an expansible or radially-adjustable ground-wheel, which wheel carries the devices for actuating the driving-shaft of the planting mechanism, whereby the ground-wheel can be adjusted to vary the intervals at which the driving-shaft engages with the gear-segments thereon in order to operate the planting mechanism and regulate the distance apart that the corn is to be planted.

A further object of my invention is to provide improved planting mechanism which is automatically operated to plant the corn below the surface of the ground and to mount or support the hopper so that it oscillates and gives to the motion of the crank-disk on the driving-shaft.

A further object of my invention is to provide two independent contrivances for separately adjusting the ground-wheel to expand or contract the same and to throw the planting mechanism out of use, which devices can be easily operated without dismounting from the machine.

A further object of my invention is to improve the parts in minor details with a view to promoting simplicity of construction and efficiency of operation.

With these and other ends in view my invention consists, first, of an expansible and contractible ground-wheel for operating the planting mechanism of the machine, which ground-wheel is composed of segments or sections which are suitably connected together to permit the same to expand and contract under the pressure of a series of radial spring-spokes, which spokes extend transversely across the wheel, are secured at the middle thereof to said wheel, and connected at their their ends to sleeves which are fitted and movable on the axle of the ground-wheel. These sleeves are adjusted simultaneously by means of a yoke, the arms of which are loosely fitted on the axle, and the forward ends of the yoke-arms are linked to the main frame of the machine, and the arms thereof are expanded or contracted by a screw-shaft which connects said arms. Within the periphery of the ground-wheel is arranged a sectional ring, the members of which correspond to the sections of the wheel and are rigidly secured to the same, and said ring sections or members are connected to each other by pin-and-slot connections to permit the same to slide or move radially a limited distance. On the ring members are formed or secured the gear-segments for operating the driving-shaft of the planting mechanism, and as the ground-wheel rotates the pinion on the driving-shaft is successively engaged with the gear-segments, so that the shaft is rotated at suitable intervals. The time of engagement of the driving-shaft with the gear-segments can be varied by expanding or contracting the ground-wheel to vary the position or distance of the gear-segments thereon with relation to each other, as is obvious. The planting mechanism consists of a hopper pivoted or mounted on the main frame to oscillate back and forth thereon with the motion of the crank-disk of the driving-shaft, and in this hopper is mounted a vertical shaft, the upper end of which carries a horizontal seed-disk, and the lower end of which has a ratchet or feeding wheel. With this ratchet-wheel engages a feeding arm or pawl, which is movable with a band on the vertically-sliding sleeve, which sleeve is fitted on the discharge-tube, which depends from and communicates with the bottom of the seed-hopper. The lower end of the sliding sleeve is cut away for a suitable distance, and against this cut-away portion is applied a pivoted or laterally-movable cap, to which is connected the band that carries the feeding arm or pawl, and this vertically-sliding sleeve and its connected parts are reciprocated vertically on the fixed depending discharge-tube by a pitman which is connected to the band and to a crank-disk on one end of the driving-shaft.

My invention further consists in the combination of devices and novel construction and arrangement of parts, as will be hereinafter more fully described and claimed.

Figure 2:
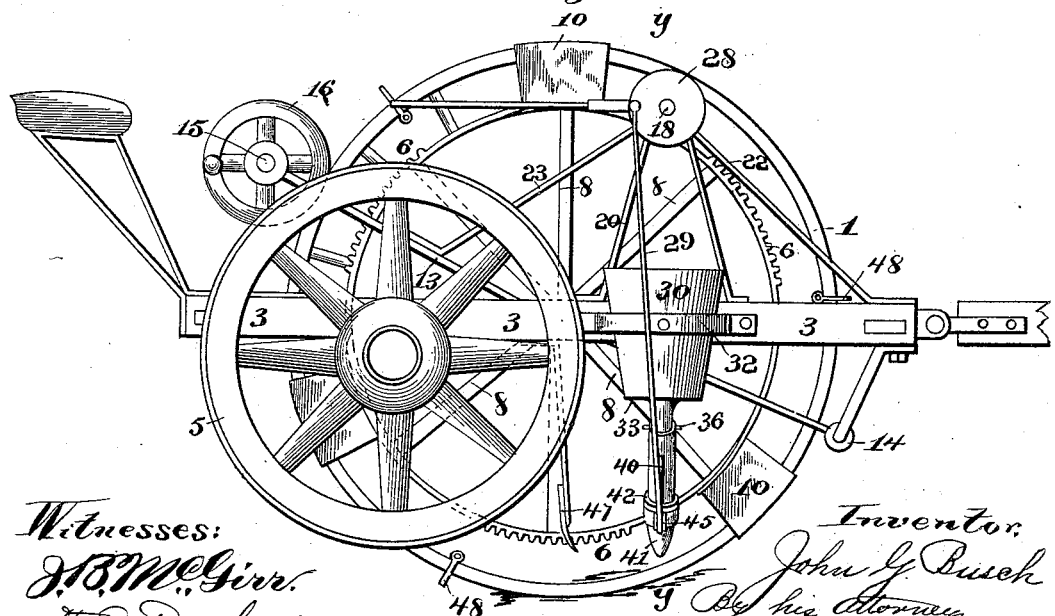

Referring to the drawings, Figure 1 is a plan view of a corn-planter embodying my invention. Fig. 2 is a side elevation of the same. Fig. 3 is a view of the planting mechanism, in side elevation, detached from the machine. Fig. 4 is an enlarged detail sectional view showing the collar connecting the two wheel-rims. Fig. 5 is a vertical longitudinal sectional view through the planting mechanism.

Like numerals denote corresponding parts in all the figures of the drawings, referring to which—

1 designates a ground-wheel, which is carried by an axle 2, journaled in suitable bearings on a frame 3.

Near the rear of the machine, on each side of the main frame thereof, is secured to the frame 3 a stub-axle 4, having on its outer end a carrying-wheel 5.

Within the periphery of the ground-wheel 1 and concentric with the same is a second or internal ring 6, which is connected to the periphery of the ground-wheel 1 by a series of short posts 7. The internal ring 6 and the ground-wheel 1 are supported by long radial and curved spokes 8, each consisting of a flat piece of steel, which is secured at each end to a collar 9, said collars being loosely fitted on the axle 2 near the ends of the same, and at their center said curved spokes are secured by a bolt to the periphery of the internal ring 6. The internal ring 6 and ground-wheel 1 are each composed of sections or members, which are united by means of a collar 10, (see Figs. 2 and 4,) which passes over the periphery of the ground-wheel at the point where the sections lap each other, and the collar 10 is rigidly fastened at one end to one of the sections of the internal ring 6 and its other end is bifurcated and fitted in the two slots 11 12, formed in each section of the internal ring 6, as shown in Figs. 1 and 4.

13 designates a yoke, which is fitted loosely on the axle 2 of the ground-wheel, and the forward ends of the arms of the yoke are linked to the main frame of the machine by the links 14, and the rear ends of which are connected by the screw-shaft 15, which has a hand-wheel 16 on one end, whereby the arms of the yoke can be compressed upon the sliding sleeves to force the same upon the curved spring-spokes to expand the ground-wheel and the internal ring of the same. By turning the hand-wheel 16 the rear ends of the yoke-arms 13 are drawn toward each other, and as the forward ends of said yoke are kept in one position by the links 14 pressure is applied to the sliding collars 9 and they are caused to move on axle 2 toward each other. This adjustment of the sleeves compresses the spokes and the segments of the wheels are forced radially and the size thereof enlarged. When the shaft is turned in the reverse direction, the pressure on the sliding collars is relaxed and the wheels resume their normal positions.

Around the axle 2, between the yoke and the main frame on each side, is fitted a coiled spring 3'.

The internal ring 6 is of greater width than the rim of the ground-wheel 1, and at regular intervals said internal ring is provided with gear-segments 9', with which meshes a pinion 17, carried on one end of a driving-shaft 18, which is journaled in bearings 19. One of these bearings 19 is supported on the main frame by rods 20, while the other bearing is supported by the arms, two of which 21 22 are secured on the main frame and the other one 23 is secured to the yoke 13. The end of the driving-shaft 18 is squared, and on this squared portion is fitted a sliding collar 25, which carries the pinion 17. The collar is moved lengthwise on the shaft by means of a hand-lever 26, having its fulcrum in an extended arm of one of the bearings 19, one of the ends of said lever being fitted loosely on the collar.

To the outer end of the shaft 18 is attached a crank-disk 28, to which is attached the pitman 29, for operating the planting mechanism.

In front of one of the carrying-wheels is located a seed-hopper 30, which is attached to the main frame. The seed-hopper is supported in position by means of a pivot-bolt 31 and the brace 32, which brace is attached at its ends to the under side of the main frame and is curved outward, so as to form a seat for the seed-hopper. The bottom of the seed-hopper 33 is attached to the side walls of the same by means of bolts for the purpose of readily removing the same. In the bottom of the seed-hopper is journaled a vertical shaft 34, which carries at its upper end a perforated seed-disk 35 and at its lower end a ratchet or feeding wheel 36. To the bottom of the seed-hopper and communicating therewith is attached the vertical seed-tube 37, having on one side a short projecting rib 38. On this seed-tube is fitted a vertically-reciprocating sleeve 39, which has its lower end cut away on one side, and this sleeve is provided with a slot 40, through which passes the rib 38 on the seed-tube 37. The opening in the lower end of the sleeve 39 is normally closed by a cap 41, the upper end of which is made integral with a band 42, and the ends of this band are fitted and secured in slots 43 in the sleeve 39 to permit the cap to open and close. To this cap 41 are fulcrumed the bifurcated arms of a lever 44, and between the bifurcated end of said lever 44 is secured the pitman 29 by means of a transverse bolt 45. The other end of lever 44 has attached to it a vertical feeding pawl or arm 46, the upper end of which fits between two of the teeth of the ratchet, which is secured to the lower end of the vertical shaft carrying the perforated seed-disk, and said feeding pawl or arm is adapted to rotate the ratchet 36 one tooth for every revolution of the crank-disk 28. By securing the upper end of the cap 41 to the sleeve 39 the latter is caused to slide or reciprocate vertically on the seed-tube 37 when the crank-disk is rotated; but the movement of the sleeve is limited by the rib or key 38 on the seed-tube 37.

At the rear side of the lever 44 is secured an arm which carries a covering-shovel 47 to cover the corn after it has been deposited in the ground by the planting mechanism.

The rear wall of the seed-hopper is cut away near its lower end, and in the opening thus formed is fitted a pane of glass to enable the operator to ascertain at a glance the amount of corn in the box.

To the ground-wheel 1 are secured at regular intervals markers 48.

The operation of my invention is as follows: The seed-box is filled with corn, and as the machine is moved forward the ground-wheel 1 revolves and the pinion 17 is moved lengthwise on the driving-shaft 18, so that it meshes with the gear-segments 9' on the periphery of the internal ring 6, and thus rotates the driving-shaft 18. The crank-disk 28 is revolved and imparts a reciprocating motion to the pitman 29, which thus alternately depresses and raises the end of lever 44, to which it is attached. On each upstroke of the pitman 29 the end of the lever 44 opposite from where the pitman is attached is lowered, and the feeding pawl or arm secured to the end of such lever is thrown inward at its upper end, thus turning the ratchet 36 on the lower end of the vertical shaft 34, carrying the perforated seed-disk one tooth. When the pitman is lowered, it causes the sliding sleeve 39 and its cap 41 to descend and penetrate the ground to drop the seed therein, and as the pitman is raised the sliding sleeve is moved vertically on the seed-tube 37 until it is stopped by the key or rib 38, and at the same time the cap 41, which is connected to the sliding sleeve 39, is moved upward a short distance, thus leaving an opening between the ends of the sleeve 39 and cap 41, through which opening the seed in tube 37 falls into the hole made in the ground by the ends of the cap and the sleeve on the downward stroke of the pitman. At every stroke of the pitman the ratchet on the lower end of the shaft which carries the seed-disk is turned one notch, and thus the seed-disk is revolved and its peforations one after another align with the opening in the upper end of seed-tube 37 to allow the seed in the seed-hopper to pass into said tube and be deposited in the ground, as hereinbefore explained. The corn is covered by the covering-shovel 47. When it is desired to plant the hills of corn closer together, the wheel 16 and the screw-shaft 15 are turned to allow the rear ends of yoke 13 to spread farther apart, and the weight of the machine on the ground-wheel 1 causes the spring-spokes to lengthen somewhat and the different members or sections of the ground-wheel 1 and the internal ring 6 to move so as to overlap each other quite a distance. This movement of the sections or members of said ground-wheel and the internal ring is limited by the bent ends on one section of the internal ring 6 coming in contact with the forward end of the slots in the section of the ring adjacent to the same. To plant the corn in hills farther apart, the hand-wheel 16 and screw-shaft 15 are turned, and the operation previously described is reversed. The spring-spokes are aided in causing the enlargement of wheels 1 and 6 by the coiled springs 3' around the axle and between the main frame and the yoke.

In the drawings I have illustrated a machine having a seed-hopper and planting mechanism on only one side of the ground-wheel; but it is apparent that the planting mechanism can be duplicated and placed on both sides of the ground-wheel, and thus plant two rows at one and the same time.

I am aware that changes and modifications can be made in the form and proportion of parts and details of construction can be made without departing from the spirit or sacrificing the advantages thereof, and I would therefore have it understood that I do not confine myself strictly to the devices herein shown, but reserve the right to make such changes as fairly fall within the scope of my invention.

In lieu of extending the front ends of the yoke beyond the axle and supporting the extreme front ends thereof by links 14, the yoke-arms may be made shorter, so as to terminate within the frame and be supported by braces which are attached to the axle.

I do not restrict myself to the exact device herein shown and described for connecting the sections of the ground-wheel to permit the sections to have a limited play for the purpose of expanding and contracting the ground-wheel; nor do I limit myself to the particular frame and the means shown in the accompanying drawings for connecting the tongue to said frame.

It is evident that the carrying-wheels and stub-axles may be dispensed with by providing two ground-wheels, which are carried by the axle.

Having thus fully described my invention, what I claim as new, and desire to secure by Letters Patent, is—

1. In a corn-planter, the combination, with a frame and a seed-hopper, of an expansible ground-wheel having a sectional felly adjustable radially with relation to the hub, and planting mechanism intermediate of the hopper and the sections of the ground-wheel and consisting of a distributing-disk in the hopper, a shaft arranged to gear with the ground-wheel, and devices actuated by the shaft to move the planting-disk at suitable intervals, whereby the ground-wheel can be adjusted to vary the operation of the planting mechanism, substantially as set forth.

2. In a corn-planter, the combination, with a main frame and a seed-hopper, of an expansible and contractible ground-wheel journaled to the frame and having the adjustable felly-sections thereof provided with gear-segments, a shaft adapted to mesh with said gear-segments at suitable intervals, and mechanism, substantially as described, intermediate of said shaft and a distributing-disk in the hopper for removing a predetermined quantity of seed from the hopper at each rotation of said shaft, substantially as described.

3. The combination of a main frame, the carrying-wheels, a ground-wheel having within itself an internal ring, the spring-spokes secured to said internal ring and at their ends to sliding collars on an axle, the yoke carried by the axle, and means, substantially as described, for enlarging or contracting the ground-wheel, as and for the purpose described.

4. In a corn-planter, a seed-hopper having a seed-tube, a shaft journaled in said hopper and carrying at its upper end a perforated seed-disk and at its lower end a ratchet, a vertically-sliding sleeve fitted on the seed-tube, a cap connected to the lower end of said sleeve, and mechanism, substantially as described, for rotating the ratchet and seed-disk, as and for the purpose described.

5. In a corn-planter, the combination of a main frame, carrying-wheels, a ground-wheel journaled in said main frame and having the internal ring provided with gear-segments, a shaft journaled in bearings on the main frame and having a pinion at one end and a crank-disk at the other end, a seed-hopper, planting mechanism connected to said hopper, and a pitman for communicating motion to said planting mechanism from the crank-disk, as and for the purpose described.

6. In a corn-planter, the combination of a main frame and carrying-wheels, a ground-wheel, a yoke fitted on the axle of the ground-wheel and connected at its forward end to the main frame, a shaft having its bearings in the rear ends of the yoke, coiled springs intermediate of the yoke and the sides of the main frame, a seed-hopper, and planting mechanism connected thereto and adapted to be operated by the ground-wheel through intermediate mechanism, as and for the purpose described.

7. In a corn-planter, the combination of the main frame, carrying-wheels, a ground-wheel, a seed-hopper secured to the main frame, a seed-tube communicating with said hopper, a sliding sleeve fitted on said tube and limited in its movements by a longitudinal rib or key, a cap secured to the lower end of the sliding sleeve, the lever fulcrumed on said cap and connected at one end to a vertical feed pawl or arm, a vertical shaft having a ratchet on its lower end and at its upper end the seed-disk, and means, substantially as described, for moving the seed-disk and planting mechanism, as and for the purpose described.

In testimony whereof I affix my signature in presence of two witnesses.

JOHN GEORG BUSCH.

Witnesses:
LOUIS REIFSTECK,
FRANK SLAATS.